United States Patent
Tang

(10) Patent No.: US 11,963,206 B2
(45) Date of Patent: Apr. 16, 2024

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 519 days.

(21) Appl. No.: 17/211,663

(22) Filed: Mar. 24, 2021

(65) Prior Publication Data

US 2021/0212073 A1 Jul. 8, 2021

Related U.S. Application Data

(63) Continuation of application No. PCT/CN2018/108433, filed on Sep. 28, 2018.

(51) Int. Cl.
*H04W 72/53* (2023.01)
*H04L 1/00* (2006.01)
(Continued)

(52) U.S. Cl.
CPC ........... *H04W 72/53* (2023.01); *H04L 1/0004* (2013.01); *H04L 1/1819* (2013.01);
(Continued)

(58) Field of Classification Search
CPC ....... H04W 72/21; H04W 72/53; H04W 2/53; H04W 72/0446; H04W 72/0453; H04L 1/0004; H04L 1/1819
See application file for complete search history.

(56) References Cited

U.S. PATENT DOCUMENTS 11,700,612 B2 * 7/2023 Meng .................... H04L 1/1614
 370/329
2009/0238121 A1 * 9/2009 Kotecha ................ H04L 1/0031
 370/329

(Continued)

FOREIGN PATENT DOCUMENTS

AU 2017405700 A1 10/2019
CN 106788943 A 5/2017
(Continued)

OTHER PUBLICATIONS

Guangdong OPPO Mobile Telecommunications Corp., Ltd., Extended European Search Report, EP18935122.4, dated Jul. 30, 2021, 10 pgs.

(Continued)

*Primary Examiner* — Shukri Taha
(74) *Attorney, Agent, or Firm* — Morgan, Lewis & Bockius LLP

(57) ABSTRACT

Provided by the embodiments of the present application are a wireless communication method and device, which may prevent resource waste. The method comprises: a terminal device sending indication information to a network device, the indication information being used to indicate that there is uplink data in the time domain after the indication information; and after sending the indication information in the time domain, the terminal device sending the uplink data to the network devices.

14 Claims, 7 Drawing Sheets

(51) Int. Cl.
   *H04L 1/1812*   (2023.01)
   *H04W 72/0446*  (2023.01)
   *H04W 72/0453*  (2023.01)
   *H04W 72/21*    (2023.01)

(52) U.S. Cl.
   CPC ... *H04W 72/0446* (2013.01); *H04W 72/0453* (2013.01); *H04W 72/21* (2023.01)

(56) References Cited

U.S. PATENT DOCUMENTS

| | | |
|---|---|---|
| 2011/0128928 A1 | 6/2011 | Lin et al. |
| 2017/0134236 A1* | 5/2017 | Patel .................... H04B 7/0626 |
| 2018/0124816 A1 | 5/2018 | Han et al. |

FOREIGN PATENT DOCUMENTS

| | | | |
|---|---|---|---|
| CN | 108173633 A | 6/2018 | |
| CN | 108307419 A | 7/2018 | |
| EP | 2999282 A1 | 3/2016 | |
| EP | 3307002 A1 | 4/2018 | |
| EP | 3370364 A1 | 9/2018 | |
| EP | 3554118 A1 | 10/2019 | |
| JP | 2018509812 A | 4/2018 | |
| WO | WO-2017132999 A1 * | 8/2017 | ........... H04L 1/1887 |
| WO | WO2018107502 A1 | 6/2018 | |
| WO | WO2020/062068 A1 | 4/2020 | |

OTHER PUBLICATIONS

Guangdong OPPO Mobile Telecommunications Corp., Ltd., Communication Pursuant to Article 94(3), EP18935122.4, dated Feb. 18, 2022, 4 pgs.
Guangdong OPPO Mobile Telecommunications Corp., Ltd., Examination Report, IN202127013129, dated Feb. 16, 2022, 6 pgs.
Guangdong OPPO Mobile Telecommunications Corp. Ltd., CN202110517176.4, Office Action, dated Jan. 18, 2023, 12 pgs.
Guangdong OPPO Mobile Telecommunications Corp., Ltd., International Search Report and Written Opinion, PCT/CN2018/108433, dated Jun. 27, 2019, 11 pgs.
Guangdong OPPO Mobile Telecommunications Corp. Ltd., First Office Action, JP2021-517626, dated Jul. 5, 2022, 8 pgs.
Guangdong OPPO Mobile Telecommunications Corp. Ltd., Request for CNIPA Patent Priority Review, CN202110517176.4, dated Jun. 24, 2022, 4 pgs.
Guangdong OPPO Mobile Telecommunications Corp. Ltd., First Office Action, CN202110517176.4, dated Aug. 9, 2022, 17 pgs.
Guangdong OPPO Mobile Telecommunications Corp. Ltd., CN202110517176.4, Second Office Action, dated Oct. 24, 2022, 17 pgs.
Institute for Information Industry (III), "On reliability of URLLC transmission in uplink", 3GPP TSG-RAN WG1 Meeting #90, R1-1714364, 6.1.3.3.8 Ultra-reliable part of URLLC for scheduling/HARQ, Prague, P.R. Czechia Aug. 21-25, 2017, 4 pgs.
Guangdong OPPO Mobile Telecommunications Corp. Ltd., JP2021-517626, Decision of Rejection, Oct. 25, 2022, 6 pgs.

* cited by examiner

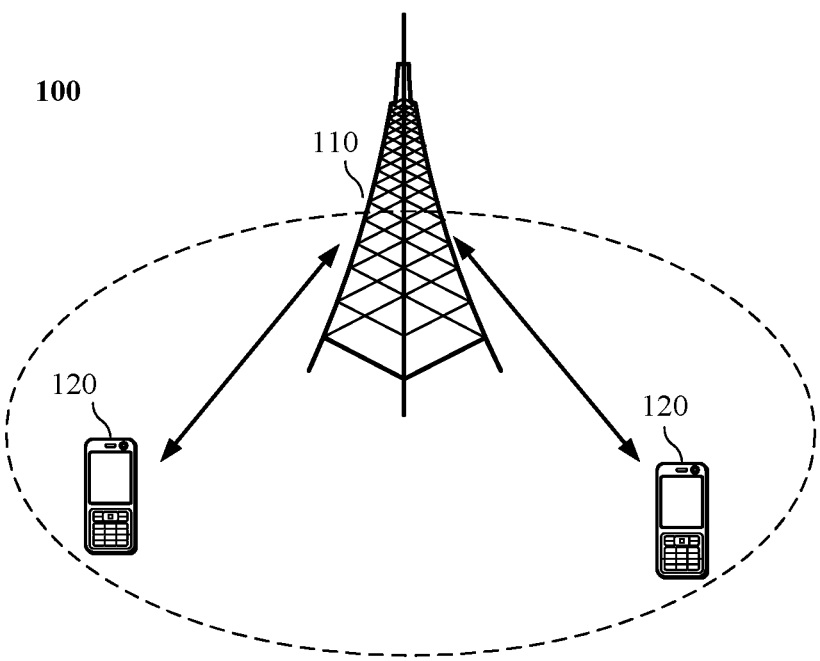

400

410 — The network device receives indication information sent by a terminal device, and the indication information is used to indicate that there is uplink data in a time domain after the indication information 420 — After sending the indication information in the time domain, the terminal device sends the uplink data to the network device

Fig.8

Start

500

510 — The terminal device sends indication information to a network device, where the indication information is used to indicate that there is no uplink data on a pre-configured resource, and the indication information is located before the pre-configured resource End

Fig.9

WIRELESS COMMUNICATION METHOD, TERMINAL DEVICE AND NETWORK DEVICE

CROSS-REFERENCE TO RELATED APPLICATION

This application is a continuation of PCT Application No. PCT/CN2018/108433, filed on Sep. 28, 2018, the entire contents of which are incorporated herein by reference.

TECHNICAL FIELD

The present application relates to the field of communication, and more particularly, to a wireless communication method, a terminal device and a network device.

BACKGROUND

In a current new radio (NR) system, an ultra-reliable low latency communication (URLLC) service is introduced, which is characterized by realizing an ultra-high reliability (e.g., 99.999%) transmission within an extreme delay (e.g., 1 ms).

In order to achieve this object, the concept of grant free was proposed. The grant free adopts a pre-configured resource configuration method/resource configuration method of semi-persistent state, and a terminal device can transmit on the configured resources according to a service requirement.

The resources are semi-static/semi-persistent configured, but the actual occupation of the resources is dynamic. Therefore, the allocation of the resources and the actual demand may not match, and there is a problem of waste of resources.

SUMMARY

The wireless communication method and device according to the embodiments of the present application can avoid waste of resources.

In a first aspect, there is provided a communication method. The method includes: sending, by a terminal device, indication information to a network device, the indication information being used to indicate that there is uplink data in a time domain after the indication information; and after sending the indication information in the time domain, sending, by the terminal device, the uplink data to the network device.

In a second aspect, there is provided a wireless communication method, including: receiving, by a network device, indication information sent by a terminal device, the indication information being used to indicate that there is uplink data in a time domain after the indication information; and after receiving the indication information in the time domain, receiving, by the network device, the uplink data sent by the terminal device.

In a third aspect, there is provided a wireless communication method. The method includes: sending, by a terminal device, indication information to a network device, the indication information being used to indicate that there is no uplink data on a pre-configured resource, and the indication information being located before a current resource.

In a fourth aspect, there is provided a wireless communication method. The method includes: detecting, by a network device, indication information sent by a terminal device, the indication information being used to indicate that there is no uplink data on a current resource among pre-configured resources, and the indication information being located before the current resource.

In a fifth aspect, there is provided a terminal device. The terminal device is used to execute the method in the first aspect or second aspect described above.

Specifically, the terminal device includes a function module used to execute the method in the first aspect or second aspect described above.

In a sixth aspect, there is provided a network device. The network device is used to execute the method in the third or fourth aspect described above.

Specifically, the terminal device includes a function module used to execute the method in the third aspect or fourth aspect described above.

In a seventh aspect, there is provided a terminal device, including a processor and a memory. The memory is used to store a computer program, and the processor is used to call and run the computer program stored in the memory, to execute the method in the first aspect or the second aspect described above.

In an eighth aspect, there is provided a network device, including a processor and a memory. The memory is used to store a computer program, and the processor is used to call and run the computer program stored in the memory, to execute the method in the third aspect or fourth aspect described above.

In a ninth aspect, there is provided a chip. The chip is used to implement the method in the first aspect described above.

Specifically, the chip includes: a processor for calling and running a computer program from a memory so that a device mounted with the chip executes the method in the first aspect or second aspect described above.

In a tenth aspect, there is provided a chip. The chip is used to implement the method in the third aspect or fourth aspect described above.

Specifically, the chip includes: a processor for calling and running a computer program from a memory so that a device mounted with the chip executes the method in the third aspect or fourth aspect described above.

In an eleventh aspect, there is provided a computer readable storage medium. The computer readable storage medium is used to store a computer program, and the computer program enables a computer to execute the method in the first aspect or second aspect described above.

In a twelfth aspect, there is provided a computer readable storage medium. The computer readable storage medium is used to store a computer program, and the computer program enables a computer to execute the method in the third aspect or fourth aspect described above.

In a thirteenth aspect, there is provided a computer program product. The computer program product includes computer program instructions, and the computer program instructions enable a computer to execute the method in the first aspect or second aspect described above.

In a fourteenth aspect, there is provided a computer program product. The computer program product includes computer program instructions, and the computer program instructions enable a computer to execute the method in the third aspect or fourth aspect described above.

In a fifteenth aspect, there is provided a computer program. When the computer program is run on a computer, the computer program enables the computer to execute the method in the first aspect or second aspect described above.

In a sixteenth aspect, there is provided a computer program. When the computer program is run on a computer, the computer program enables the computer to execute the method in the third aspect or fourth aspect described above.

Therefore, in the embodiments of the present application, a terminal device sends indication information to a network device, the indication information being used to indicate that there is uplink data in a time domain after the indication information, and after sending the indication information in the time domain, the terminal device sends the uplink data to the network device. Therefore, the indication information can be used to indicate that some resources are occupied, which is convenient for the network device to coordinate the resources, and there is no need to (for example, semi-statically or semi-persistently) reserve resources for uplink data, thereby avoiding a waste of resources.

BRIEF DESCRIPTION OF THE DRAWINGS

FIG. 1 is a schematic diagram of a communication system architecture provided by an embodiment of the present application.

FIG. 2 is a schematic flowchart of a wireless communication method provided by an embodiment of the present application.

FIG. 8 is a schematic flowchart of a wireless communication method provided by an embodiment of the present application.

FIG. 9 is a schematic flowchart of a wireless communication method provided by an embodiment of the present application.

DETAILED DESCRIPTION

Figure 3:
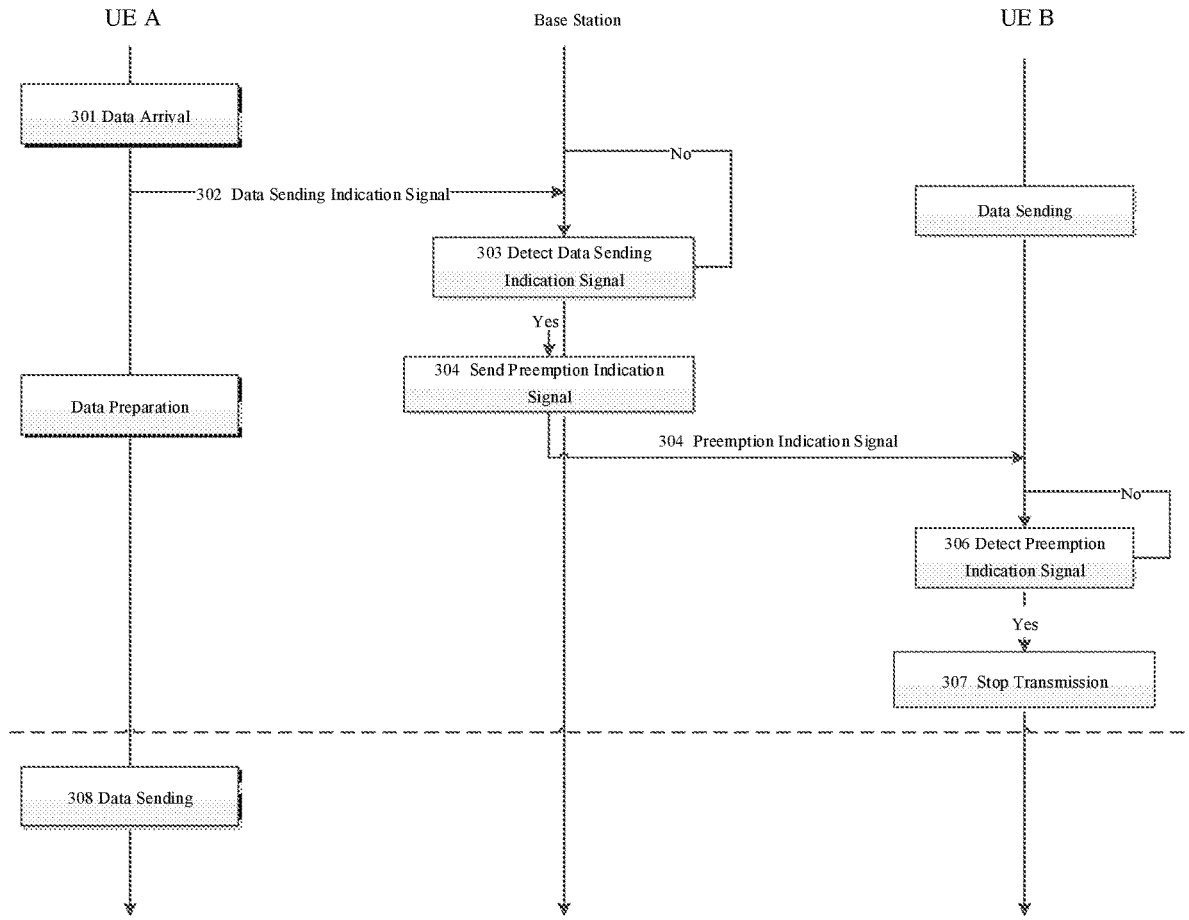
FIG. 3 is a schematic flowchart of a wireless communication method provided by an embodiment of the present application.

The technical solutions in the embodiments of the present application are described in the following with reference to the drawings in the embodiments of the present application. It is apparent that the embodiments described below are only part, but not all, of the embodiments of the present application. All other embodiments obtained by those skilled in the art based on the embodiments of the present application without paying an inventive labor are within the protection scope of the present application.

The technical solutions of the embodiments of the present application may be applied to various communication systems, such as a Global System of Mobile communication (GSM), a Code Division Multiple Access (CDMA) system, a Wideband Code Division Multiple Access (WCDMA) system, General Packet Radio Service (GPRS), a Long Term Evolution (LTE) system, an LTE Frequency Division Duplex (FDD) system, an LTE Time Division Duplex (TDD), a Universal Mobile Telecommunication System (UMTS), a Worldwide Interoperability for Microwave Access (WiMAX) communication system, or a 5G system.

Exemplarily, a communication system 100 applied in the embodiments of the present application is shown in FIG. 1. The communication system 100 may include a network device 110, and the network device 110 may be a device that communicates with a terminal device 120 (or referred to a communication terminal or a terminal). The network device 110 may provide communication coverage for a specific geographic area, and may communicate with a terminal device located within the coverage area. Optionally, the network device 100 may be a Base Transceiver Station (BTS) in a GSM system or CDMA system, a NodeB (NB) in a WCDMA system, an Evolutional Node B (eNB or eNodeB) in an ETE system, or a radio controller in a Cloud Radio Access Network (CRAN). Or, the network device may be a mobile switching center, a relay station, an access point, an on-board device, a wearable device, a hub, a switch, a bridge, a router, a network side device in the 5G network, or a network device in a future evolved Public Land Mobile Network (PLMN), etc.

The communication system 100 further includes at least one terminal device 120 located within the coverage area of the network device 110. As used herein, the "terminal device" includes, but is not limited to: a connection via wired lines, such as via a Public Switched Telephone Network (PSTN), a Digital Subscriber Line (DSL), a digital cable, and a direct cable connection; and/or another data connection/network; and/or via a wireless interface, such as for a cellular network, a Wireless Local Area Network (WLAN), a digital TV network such as DVB-H networks, a satellite network, an AM-FM broadcast transmitter; and/or an apparatus of another terminal device that is set to receive/send a communication signal; and/or an Internet of Things (IoT) device. The terminal device set to communicate through a wireless interface may be referred to as a "wireless communication terminal", a "wireless terminal" or a "mobile terminal". Examples of mobile terminals include, but are not limited to, a satellite or cellular phone; a Personal Communications System (PCS) terminal that can combine a cellular radio phone with data processing, fax, and data communication capabilities; the mobile terminals can include a radio phone, a pager, Internet/intranet access, a Web browser, a memo pad, a calendar, and/or a PDA of a Global Positioning System (GPS) receiver; and a conventional laptop and/or palmtop receivers or other electronic apparatuses including a radio telephone transceiver. The terminal device may refer to an access terminal, User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, an on-board device, a wearable device, a terminal device in the 5G network, or a terminal device in a future evolved PLMN, or the like.

Optionally, a Device to Device (D2D) communication may be executed between the terminal devices 120.

Optionally, the 5G system or 5G network may also be referred to as a New Radio (NR) system or NR network.

FIG. 1 exemplifies one network device and two terminal devices. Optionally, the wireless communication system 100 may include a plurality of network devices and other quantities of terminal devices may be included within a coverage area of each network device. The embodiments of the present application are not limited thereto.

Optionally, the wireless communication system 100 may include other network entities such as a network controller, and a mobility management entity. The embodiments of the present application are not limited thereto.

It should be understood that a device with communication functions in a network/system in the embodiments of the present application may be referred to as a communication device. Taking the communication system 100 shown in FIG. 1 as an example, the communication device may include a network device 110 and a terminal device 120 having a communication function. The network device 110 and the terminal device 120 may be the specific devices described above. For brevity, details are not described herein again. The communication device may also include other devices in the communication system 100, such as a network controller, a mobility management entity and other network entities, which are not limited in the embodiments of the present application.

The unlicensed spectrum is a spectrum that is divided by the country and region for communication of radio equipment. This spectrum can be considered as a shared spectrum, that is, when the communication devices in different communication systems meet the regulatory requirements set by the country or region on the spectrum, they may use this spectrum without requesting for a proprietary spectrum authorization from the government. In order to allow various communication systems that use the unlicensed spectrum for wireless communication to coexist friendly on the spectrum, some countries or regions have stipulated the regulatory requirements that must be met to use the unlicensed spectrum. For example, in some regions, the communication device follows the Listening Before Talking (LBT) principle, that is, the communication device needs to execute channel sensing before sending signals on the channel of the unlicensed spectrum. When result of the channel sensing is that the channel is idle, the communication device may execute signal transmission; and if the result of the channel sensing of the communication device on the channel of the unlicensed spectrum is that the channel is busy, the communication device may not execute signal transmission. The method and device in the embodiments of the present application may be used for communication in the unlicensed spectrum.

FIG. 2 is a schematic flowchart of a wireless communication method 200 according to an embodiment of the present application. The method 200 includes at least part of the following content. The method 200 may be applied to an unlicensed spectrum.

In step 210, a terminal device sends indication information to a network device, and the indication information is used to indicate that there is uplink data in a time domain after the indication information.

In step 220, after sending the indication information in the time domain, the terminal device sends the uplink data to the network device.

Specifically, when there is uplink data that needs to be sent on the unlicensed spectrum, the terminal device may send indication information on the unlicensed spectrum. The indication information may indicate that there is uplink data in the time domain after the indication information. If there is no uplink data to be sent, there is no need to send the indication information.

The terminal device may perform an LBT operation before sending the indication information, and if the LBT operation is successful, the terminal device may send the indication information.

Optionally, in the embodiment of the present application, a resource that can be used for sending the indication information may be periodic. In each sending period, the terminal device may determine whether there is uplink data to be sent, and if yes, the terminal device may send the indication information in the current period. The LBT operation may be performed before sending the indication information. If the LBT operation is successful, the uplink data may be sent. If the LBT operation is unsuccessful, the LBT operation may be continued to be performed in the next period to send the indication information, and further to send the uplink data.

It should be understood that the resource of the indication information may also be aperiodic, which is not specifically limited in the embodiment of the present application.

Optionally, in the embodiment of the present application, the terminal device may send the indication information based on configuration information of the indication information.

The configuration information of the indication information may optionally include at least one of: a time domain resource and a frequency domain resource occupied by the indication information, a power control parameter, and adopted sequence and modulation coding manner.

The configuration information of the indication information may be configured using higher layer signaling.

Alternatively, the configuration information of the indication information may be configured using higher layer signaling and physical layer signaling. For example, a part of the configuration information is configured using the higher layer signaling, and the other part of the configuration information is configured using the physical layer signaling. For example, all of the configuration information is configured using the higher layer signaling, and at least part of the configuration information may be activated by the physical layer signaling.

Alternatively, the configuration information of the indication information may be configured using higher layer signaling and Media Access Control (MAC) layer signaling. For example, a part of the configuration information is configured using the higher layer signaling, and the other part of the configuration information is configured using the MAC layer signaling. For example, all of the configuration information is configured using the higher layer signaling, and at least part of the configuration information may be activated by the MAC layer signaling.

Alternatively, the configuration information of the indication information may be semi-statically configured or semi-persistently configured.

Optionally, in the embodiment of the present application, the indication information may only be used to indicate that there is uplink data of the terminal device in the time domain after the indication information, and information used for realizing the reception of the uplink data (for example, information related to the Hybrid Automatic Repeat reQuest (HARQ) process of the uplink data, a data block size of the uplink data, a time domain resource occupied by the uplink data, a frequency domain resource occupied by the uplink data, a modulation coding level of the uplink data, and a multi-antenna mode adopted for sending the uplink data) may be preset in the network device, without being sent by the terminal device to the network device through the indication information.

Optionally, in the embodiment of the present application, the indication information may also carry configuration information of the uplink data, and the configuration information of the uplink data may be used to implement the reception of the uplink data.

Optionally, in the embodiment of the present application, the configuration information of the uplink data may include at least one of:

an association relationship between the indication information and the uplink data, information associated with a HARQ process of the uplink data, a data block size of the uplink data, a time domain resource occupied by the uplink data, a frequency domain resource occupied by the uplink data, a modulation coding level of the uplink data, and a multi-antenna mode adopted for sending the uplink data.

The association relationship between the indication information and the uplink data may be an association relationship between the indication information and the uplink data in terms of resource occupation. For example, the uplink data is offset by several time units (for example, time slots, symbols, etc.) relative to the indication information, the uplink data is offset by several subcarriers relative to the indication information, or the like.

The information of the HARQ process associated with the uplink data may include at least one of an identifier (ID) of the HARQ process of the uplink data, whether data is for new transmission or retransmission, and a redundancy version (RV).

The resource occupied by the uplink data may be a resource actually occupied by the uplink data, or may be a resource set to which the resource actually occupied by the uplink data belongs.

For example, a time domain resource occupied by the uplink data may be one time domain resource actually occupied by the uplink data, or may be a time domain resource set to which one time domain resource actually occupied by the uplink data belongs.

For example, a frequency domain resource occupied by the uplink data may be one frequency domain resource actually occupied by the uplink data, or may be a frequency domain resource set to which one frequency domain resource actually occupied by the uplink data belongs.

For example, a time-frequency domain resource occupied by the uplink data may be one time-frequency domain resource actually occupied by the uplink data, or may be a time-frequency domain resource set to which one time domain resource actually occupied by the uplink data belongs.

Optionally, the time domain resource occupied by the uplink data is indicated by carrying in the indication information at least one of: an index of the time domain resource (for example, an index in one time domain resource set), an index of the time-frequency domain resource to which the time domain resource belongs (for example, an index in one time-frequency domain resource set), an offset of the time domain resource relative to a reference point (for example, a time domain resource occupied by the indication information), and a size of the time domain resource.

The frequency domain resource occupied by the uplink data is indicated by carrying in the indication information at least one of: an index of the frequency domain resource (for example, an index in one frequency domain resource set), an index of the time-frequency domain resource to which the frequency domain resource belongs (for example, an index in one time-frequency domain resource set), an offset of the frequency domain resource relative to the reference point (for example, a frequency domain resource occupied by the indication information), and a size of the frequency domain resource.

Optionally, in the embodiment of the present application, the terminal device may send the uplink data to the network device based on pre-configuration information. At this time, the terminal may not carry the pre-configuration information in the indication information, that is, not carry the configuration information of the uplink data.

The pre-configuration information indicates at least one of: an association relationship between the indication information and the uplink data, information associated with a HARQ process of the uplink data, a data block size of the uplink data, a time domain resource occupied by the uplink data, a frequency domain resource occupied by the uplink data, a modulation coding level of the uplink data, and a multi-antenna mode adopted for sending the uplink data.

In the embodiment of the present application, the data is sent based on the pre-configuration information, thus the data can be prepared in advance, that is, there is no need to prepare the data after receiving the scheduling information, which reduces the transmission delay.

It should be understood that, in the embodiment of the present application, a part of the information for achieving uplink data reception may be carried in the indication information, and the other part of the information may be pre-configuration information.

For example, the indication information may carry at least one of: an association relationship between the indication information and the uplink data and information associated with a HARQ process of the uplink data. The pre-configuration information may include at least one of: a data block size of the uplink data, a time domain resource occupied by the uplink data, a frequency domain resource occupied by the uplink data, a modulation coding level of the uplink data, and a multi-antenna mode adopted for sending the uplink data.

Optionally, in the embodiment of the present application, the terminal device may send the uplink data based on the association relationship between the uplink data and the indication information. The association relationship may be preset (for example, preset based on a protocol, preset through higher layer signaling, preset through physical layer signaling, preset through MAC layer signaling, or preset in a semi-persistent or semi-static manner) on the terminal device, or may be indicated to the network device through the indication information.

As described above, the association relationship between the indication information and the uplink data may be the association relationship between the indication information and the uplink data in terms of resource occupation. For example, the uplink data is offset by several time units (for example, time slots, symbols, etc.) relative to the indication information, the uplink data is offset by several subcarriers relative to the indication information, or the like.

Optionally, in the embodiment of the present application, the indication information is discontinuous with the uplink data in the time domain, or may be continuous with the uplink data in the time domain.

The continuity or discontinuity of the indication information and the uplink data in the time domain mentioned in the embodiment of the present application may be based on a symbol level or a time slot level.

For example, if the continuity or discontinuity is based on the symbol level, the continuity of the indication information and the uplink data may mean that there is no separated symbol therebetween, and the discontinuity of the indication information and the uplink data may mean that there is a separated symbol(s) therebetween.

For example, if the continuity or discontinuity is based on the time slot level, the continuity of the indication information and the uplink data may mean that there is no separated time slot therebetween, and the continuity of the indication information and the uplink data may indicate that there is a separated time slot(s) therebetween.

In the embodiment of the present application, the indication information and the uplink data being not continuous in the time domain may be used for a condition in which the network side coordinates the resource, the terminal device side prepares data, and the two operations may be executed simultaneously, so as to reduce time delay.

Optionally, in the embodiment of the present application, a time unit spaced between the indication information and the uplink data is greater than or equal to a threshold. The threshold may be preset by the network device, may be determined by the terminal device, or may be preset based on a protocol.

The threshold is determined based on at least one of:

time for the terminal device to prepare the uplink data, time for the network device to decode the indication information, and time for the network device to avoid other terminal device to carry out an uplink transmission on a resource occupied by the uplink data.

The time for the terminal device to prepare the uplink data may include the time for encoding the data, and the like. The time for the network device to avoid other terminal device to carry out an uplink transmission on the resource occupied by the uplink data may be a time that the network device sends another indication information to other terminal device and other terminal device receives the another indication information after decoding the indication information. The another indication information indicates other terminal device not to execute uplink data transmission on the terminal device.

For ease of understanding, the following description will be given in conjunction with FIG. 3 and FIG. 4.

In step 301, a UEA determines that the data arrives, that is, determines that there is uplink data needing to be sent.

In step 302, the UEA sends data sending indication information to a base station, indicating that there is uplink data that needs to be sent after the data sending indication information in the time domain.

In step 303, the base station detects the data sending indication information. If the data sending indication information has been detected by the base station, the base station executes step 304. If the data sending indication information has not been detected by the base station, the base station continues the detection.

In step 304, the base station sends preemption indication information to a UEB, where the UEB mentioned here may be a UE that may need or has been determined to need to execute uplink transmission on the occupied resources of the uplink data of the UEA. For example, the occupied resources of the uplink data of the UEA may belong to semi-statically configured resources configured for UEB for uplink transmission, or may be resources for scheduling UEB.

In step 306, the UEB detects the preemption indication information sent by the base station. If the preemption indication information has been detected by the UEB, the UEB executes 307. If the preemption indication information has not been detected by the UEB, the UEB continues the detection.

In step 307, based on the detected preemption indication information, the data transmission is stopped.

Figure 4:
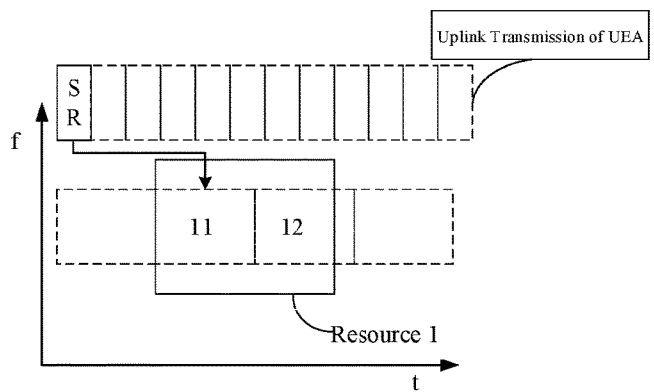
FIG. 4 is a schematic diagram of a resource mapping provided by an embodiment of the present application.

For example, as shown in FIG. 4, the uplink data in an uplink transmission of the UEA needs to occupy resource 11 in resource 1, and resource 1 originally needs or may need to transmit the uplink data of the UEB, the base station may instruct the UEB to stop transmission on resource 11, and execute the uplink transmission on resource 12 except resource 11 on resource 1.

Figure 5:
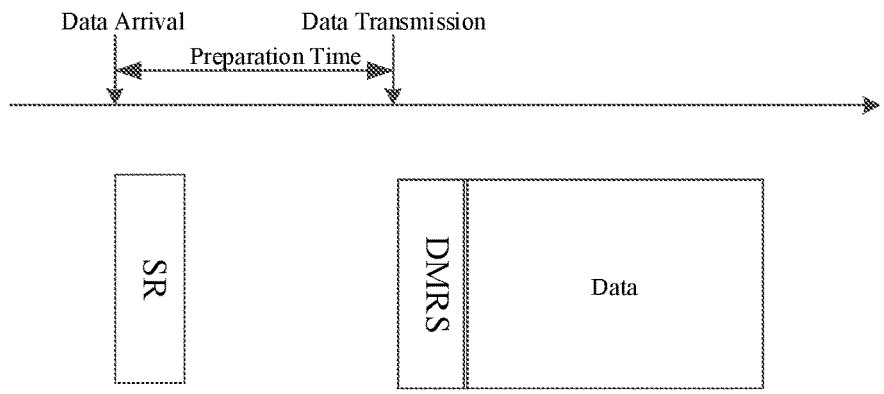
FIG. 5 is a schematic diagram of a type and position of indication information of an embodiment of the present application.

Optionally, in the embodiment of the present application, the indication information may have the same format as a Scheduling Request (SR). At this time, the DMRS used for demodulating the uplink data may be sent together with the uplink data, for example, as shown in FIG. 5. In this case, the indication information reuses existing signaling without additional design overhead.

It should be understood that the SR shown in FIG. 5 refers to indication information having the same format as the SR. In addition to the SR, there may also be other dedicated information used for implementing the function of the indication information mentioned in the embodiment of the present application.

Figure 6:
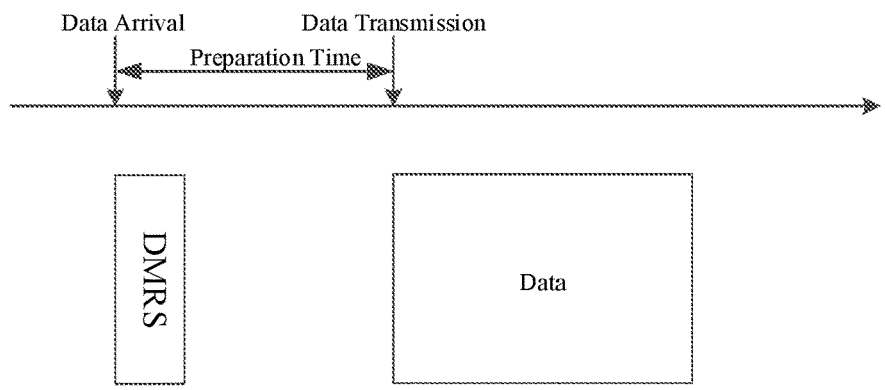
FIG. 6 is a schematic diagram of a type and position of indication information of an embodiment of the present application.

Optionally, in the embodiment of the present application, the indication information is a first demodulation reference signal (DMRS). The first DMRS is used for demodulating the uplink data, for example, as shown in FIG. 6. In this scheme, the DMRS may have both indication and demodulation functions, thereby improving the transmission efficiency.

In the scheme shown in FIG. 6, in addition to the DMRS as the indication information, the DMRS may also be sent with the uplink data, so as to realize the pilot enhanced demodulation performance for the uplink data.

Optionally, in the embodiment of the present application, the indication information is uplink control information (UCI) and/or a second DMRS for demodulating the UCI. For example, as shown in FIG. 7, the UCI may be the indication information mentioned in the embodiment of the present application.

Optionally, in the embodiment of the present application, the DMRS for demodulating UCI may be sent along with the UCI, and the DMRS for demodulating the UCI may also be used to demodulate uplink data. At this point, the DMRS for demodulating the uplink data may no longer be sent with the uplink data. In this scheme, the UCI is used as the indication information, which can increase the flexibility of the uplink transmission.

Optionally, in the embodiment of the present application, the UCI may be used to indicate the configuration information of the uplink data.

Figure 7:
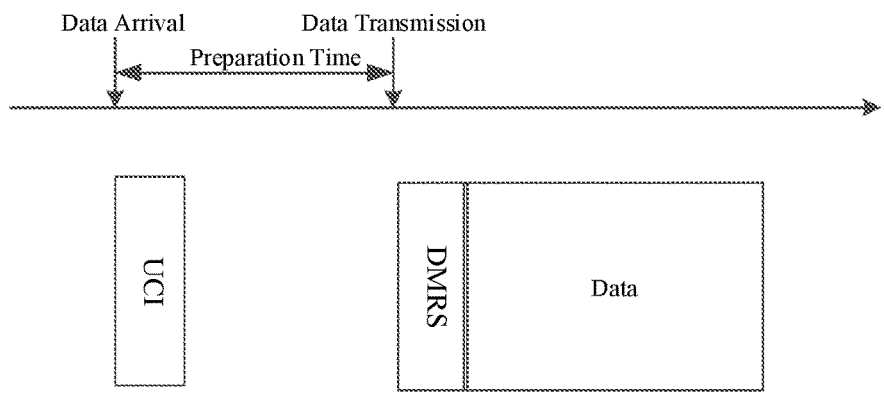
FIG. 7 is a schematic diagram of a type and position of the indication information of the embodiment of the present application.

The preparation time between the indication information and the data shown in FIG. 5 to FIG. 7 may be the time for the terminal device to prepare the uplink data.

Optionally, in the embodiment of the present application, the network device may preconfigure the configuration information of the uplink data or the configuration information of the indication information.

For example, the network device may configure: a period, an offset, a frequency domain resource, and a sequence parameter (such as a cyclic shift value, etc.) of the indication information; and/or the network device may configure: a period, an offset, a time domain/frequency domain resource length, and a reference signal, etc. of an uplink data transmission resource; and/or the network device may configure: a corresponding relationship between the indication information and the uplink data transmission resource, for example, when the indication information is in a time slot a, the corresponding uplink data transmission resource is after the SR and is closest to the SR; and for another example, when the indication information is in a time slot (slot) (satisfying Mod(slot, 4)=a) corresponding to the $(a+1)^{th}$ uplink data transmission resource configuration set, the uplink data transmission resource is after the SR and closest to the SR.

For example, the network device may configure: a period, offset, frequency domain resource and sequence parameter (a cyclic shift value) of the indication information; and/or the network device may configure: time-frequency domain resource length and reference information, etc. of the uplink data transmission resource, and relative time-frequency relationship with the indication information, etc.

The network device may configure through higher layer signaling, combination of higher layer signaling and physical layer signaling (MAC layer signaling), and the network device may configure semi-persistently or semi-statically, etc.

Therefore, in the embodiment of the present application, the terminal device sends indication information to a network device. The indication information is used to indicate that there is uplink data in a time domain after the indication information. After sending the indication information in the time domain, the terminal device sends the uplink data to the network device. In this way, the indication information can be used for indicating that certain resources are occupied, which is convenient for the network device to coordinate resources, and there is no need to reserve (for example, semi-statically or semi-persistently) resources for uplink data, thereby avoiding waste of resources.

FIG. 8 is a schematic flowchart of a wireless communication method 400 according to an embodiment of the present application. The method 400 includes at least part of the following content.

In step 410, a network device receives indication information sent by a terminal device, and the indication information is used to indicate that there is uplink data in a time domain after the indication information.

In step 440, after receiving the indication information in the time domain, the network device receives the uplink data sent by the terminal device.

Optionally, in the embodiment of the present application, the indication information is received based on configuration information for the indication information, and the configuration information optionally includes at least one of:

a time domain resource and a frequency domain resource occupied by the indication information, a power control parameter, and adopted sequence and modulation coding manner.

Optionally, in the embodiment of the present application, the indication information further carries configuration information of the uplink data; and the network device may receive the uplink data sent by the terminal device based on the configuration information of the uplink data.

The configuration information optionally indicates at least one of:

an association relationship between the indication information and the uplink data, information associated with a HARQ process of the uplink data, a data block size of the uplink data, a time domain resource occupied by the uplink data, a frequency domain resource occupied by the uplink data, a modulation coding level of the uplink data, and a multi-antenna mode adopted for sending the uplink data.

Optionally, the time domain resource occupied by the uplink data is indicated by carrying in the indication information at least one of: an index of the time domain resource, an index of a time-frequency domain resource to which the time domain resource belongs, an offset of the time domain resource relative to a reference point, and a size of the time domain resource; and/or the frequency domain resource occupied by the uplink data is indicated by carrying in the indication information at least one of: an index of the frequency domain resource, an index of a time-frequency domain resource to which the frequency domain resource belongs, an offset of the frequency domain resource relative to a reference point, and a size of the frequency domain resource.

Optionally, in the embodiment of the present application, the network device receives the uplink data sent by the terminal device based on pre-configuration information.

The pre-configuration information optionally indicates at least one of:

an association relationship between the indication information and the uplink data, information associated with a HARQ process of the uplink data, a data block size of the uplink data, a time domain resource occupied by the uplink data, a frequency domain resource occupied by the uplink data, a modulation coding level of the uplink data, and a multi-antenna mode adopted for sending the uplink data.

Optionally, in the embodiment of the present application, the network device receives the uplink data sent by the terminal device based on an association relationship between the uplink data and the indication information.

The network device optionally configures the association relationship to the terminal device.

Optionally, in the embodiment of the present application, the indication information is discontinuous with the uplink data in the time domain.

Optionally, in the embodiment of the present application, a time unit spaced between the indication information and the uplink data is greater than or equal to a threshold.

The threshold is optionally determined based on at least one of:

time for the terminal device to prepare the uplink data, time for the network device to decode the indication information, and time for the network device to avoid other terminal device to carry out an uplink transmission on a resource occupied by the uplink data.

Optionally, in the embodiment of the present application, the indication information has the same format as a scheduling request (SR).

Optionally, in the embodiment of the present application, the indication information is a first demodulation reference signal (DMRS).

Optionally, in the embodiment of the present application, the first DMRS is used to demodulate the uplink data.

Optionally, in the embodiment of the present application, the indication information is uplink control information (UCI) and/or a second DMRS for demodulating the UCI.

Optionally, in the embodiment of the present application, the UCI is further used to indicate configuration information of the uplink data.

It should be understood that the description of the method 400 may refer to the description of the terminal device. For brevity, details are not described herein again.

FIG. 9 is a schematic block diagram of a wireless communication method 500 according to an embodiment of the present application. The method 500 includes at least part of the following content.

In step 510, a terminal device sends indication information to a network device, where the indication information is used to indicate that there is no uplink data on a pre-configured resource, and the indication information is located before the pre-configured resource.

Specifically, the terminal device may have a pre-configured resource. Before the pre-configured resource, if no data arrives (that is, there is no uplink data that needs to be sent), the terminal device may send indication information. The indication information may indicate that there is no uplink data transmission on the pre-configured resource. In this way, for the pre-configured resource, if the network device receives the indication information, the network device can no longer perform detection of the uplink data, or can indicate other terminal device(s) to perform uplink transmission on the pre-configured resource.

The terminal device may execute an LBT operation before sending the indication information, and if the LBT operation is successful, the terminal device may send the indication information.

Optionally, the time interval between the indication information and the pre-configured resource may be determined based on the time when the network device indicates other terminal device(s) to execute uplink transmission on the pre-configured resource, and/or the time when other terminal device(s) prepares uplink data.

If there is uplink data transmission on the pre-configured resource, the terminal device may send the uplink data on the pre-configured resource.

Optionally, in the embodiment of the present application, the pre-configured resource may be a periodic resource. If there is uplink data transmission in one period, the indication information may not be sent. If there is no uplink data transmission in another period, the indication information may be sent.

Optionally, in the embodiment of the present application, the indication information has the same format as a scheduling request.

Optionally, in the embodiment of the present application, the terminal device may send the indication information based on configuration information of the indication information.

The configuration information of the indication information optionally includes at least one of: a time domain resource and a frequency domain resource occupied by the indication information, a power control parameter, and adopted sequence and modulation coding manner.

The configuration information of the indication information may be configured using higher layer signaling.

Alternatively, the configuration information of the indication information may be configured using higher layer signaling and physical layer signaling. For example, a part of the configuration information is configured using the higher layer signaling, and the other part of the configuration information is configured using the physical layer signaling. For example, all of the configuration information is configured using the higher layer signaling, where at least part of the configuration information may be activated by the physical layer signaling.

Alternatively, the configuration information of the indication information may be configured using higher layer signaling and Media Access Control (MAC) layer signaling. For example, a part of the configuration information is configured using the higher layer signaling, and the other part of the configuration information is configured using the MAC layer signaling. For example, all of the configuration information is configured using the higher layer signaling, where at least part of the configuration information may be activated by the MAC layer signaling.

Alternatively, the configuration information of the indication information may be semi-statically configured or semi-persistently configured.

Optionally, in the embodiment of the present application, the terminal device sends indication information to the network device. The indication information is used to indicate that there is no uplink data on the pre-configured resource, and the indication information is located before the pre-configured resource. In this way, the pre-configured resource can be used for other purposes, so resource waste can be avoided.

The description of the method 500 may refer to the description in the same implementation as that of the method 200. For brevity, details are not repeated here.

Figure 10:
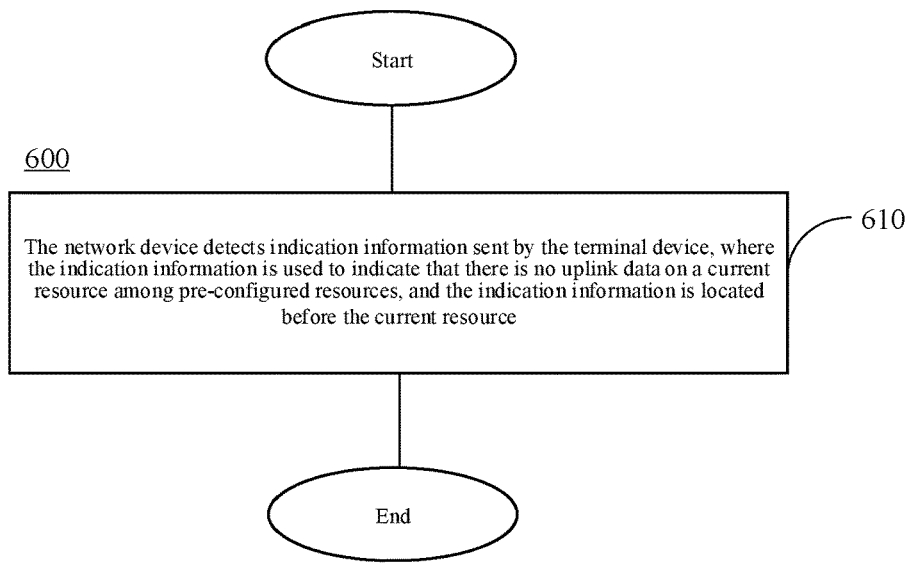
FIG. 10 is a schematic flowchart of a wireless communication method provided by an embodiment of the present application.

FIG. 10 is a schematic block diagram of a wireless communication method 600 according to an embodiment of the present application. The method 600 includes at least part of the following content.

In step 610, the network device detects indication information sent by the terminal device, where the indication information is used to indicate that there is no uplink data on a current resource among pre-configured resources, and the indication information is located before the current resource.

When the indication information is not detected by the network device, the network device detects the uplink data sent by the terminal device on the current resource among the pre-configured resources. When the indication information is detected, the network device does not detect uplink data sent by the terminal device on the current resource among the pre-configured resources.

In the embodiment of the present application, the indication information is used to indicate that there is no uplink data on the current resource among the pre-configured resources. In the case that the detection of the indication information is missed, the missed detection of uplink data can be avoided.

Optionally, in the embodiment of the present application, the indication information has the same format as a scheduling request.

Optionally, in the embodiment of the present application, the network device may detect the indication information sent by the terminal device based on configuration information.

Optionally, in the embodiment of the present application, the configuration information includes at least one of:
  a time domain resource and a frequency domain resource occupied by the indication information, a power control parameter, and adopted sequence and modulation coding manner.

It should be understood that the description of the method 600 may refer to the description of the terminal device. For brevity, details are not described herein again.

Figure 11:
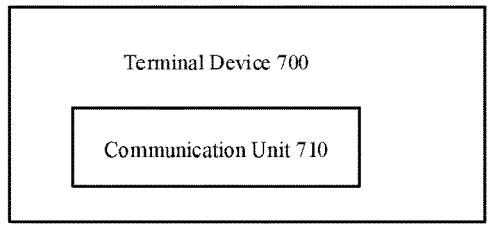
FIG. 11 is a schematic block diagram of a terminal device provided by an embodiment of the present application.

FIG. 11 is a schematic block diagram of a terminal device 700 according to an embodiment of the present application. The terminal device 700 includes a communication unit 710 configured to:

send indication information to a network device, the indication information being used to indicate that there is uplink data in a time domain after the indication information; and after sending the indication information in the time domain, send the uplink data to the network device.

Optionally, in the embodiment of the present application, the communication unit 710 is further configured to:

send the indication information based on configuration information for the indication information.

Optionally, in the embodiment of the present application, the configuration information includes at least one of:

a time domain resource and a frequency domain resource occupied by the indication information, a power control parameter, and adopted sequence and modulation coding manner.

Optionally, in the embodiment of the present application, the indication information further carries configuration information of the uplink data.

Optionally, in the embodiment of the present application, the configuration information indicates at least one of:

an association relationship between the indication information and the uplink data, information associated with a HARQ process of the uplink data, a data block size of the uplink data, a time domain resource occupied by the uplink data, a frequency domain resource occupied by the uplink data, a modulation coding level of the uplink data, and a multi-antenna mode adopted for sending the uplink data.

Optionally, in the embodiment of the present application, the time domain resource occupied by the uplink data is indicated by carrying in the indication information at least one of: an index of the time domain resource, an index of a time-frequency domain resource to which the time domain resource belongs, an offset of the time domain resource relative to a reference point, and a size of the time domain resource; and/or the frequency domain resource occupied by the uplink data is indicated by carrying in the indication information at least one of: an index of the frequency domain resource, an index of a time-frequency domain resource to which the frequency domain resource belongs, an offset of the frequency domain resource relative to a reference point, and a size of the frequency domain resource.

Optionally, in the embodiment of the present application, the communication unit 710 is further configured to:

send the uplink data to the network device based on pre-configuration information.

Optionally, in the embodiment of the present application, the pre-configuration information indicates at least one of:

an association relationship between the indication information and the uplink data, information associated with a HARQ process of the uplink data, a data block size of the uplink data, a time domain resource occupied by the uplink data, a frequency domain resource occupied by the uplink data, a modulation coding level of the uplink data, and a multi-antenna mode adopted for sending the uplink data.

Optionally, in the embodiment of the present application, the communication unit 710 is further configured to:

send the uplink data based on an association relationship between the uplink data and the indication information.

Optionally, in the embodiment of the present application, the association relationship is configured by the network device, or is preset in the terminal device based on a protocol.

Optionally, in the embodiment of the present application, the indication information and the uplink data are not continuous in the time domain.

Optionally, in the embodiment of the present application, a time unit between the indication information and the uplink data is greater than or equal to a threshold.

Optionally, in the embodiment of the present application, the threshold is determined based on at least one of:

time for the terminal device to prepare the uplink data, time for the network device to decode the indication information, and time for the network device to avoid other terminal devices to carry out an uplink transmission on a resource occupied by the uplink data.

Optionally, in the embodiment of the present application, the indication information has the same format as a scheduling request (SR).

Optionally, in the embodiment of the present application, the indication information is a first demodulation reference signal (DMRS).

Optionally, in the embodiment of the present application, the first DMRS is used to demodulate the uplink data.

Optionally, in the embodiment of the present application, the indication information is uplink control information (UCI) and/or a second DMRS for demodulating the UCI.

Optionally, in the embodiment of the present application, the UCI is further used to indicate configuration information of the uplink data.

It should be understood that, in the embodiment of the present application, the terminal device 700 may be used to implement the operations implemented by the terminal device in the above method 200. For brevity, details are not described herein again.

Figure 12:
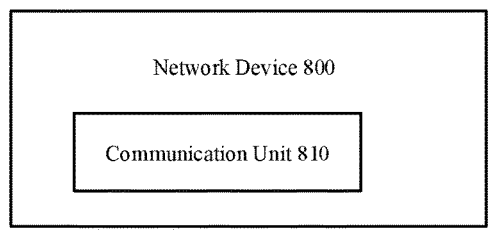
FIG. 12 is a schematic block diagram of a network device provided by an embodiment of the present application.

FIG. 12 is a schematic block diagram of a network device 800 according to an embodiment of the present application. The network device 800 includes a communication unit 810, configured to:

receive indication information sent by a terminal device, the indication information being used to indicate that there is uplink data in a time domain after the indication information; and after receiving the indication information in the time domain, receive the uplink data sent by the terminal device.

Optionally, in the embodiment of the present application, the communication unit 810 is further configured to:

receive the indication information based on configuration information for the indication information.

Optionally, in the embodiment of the present application, the configuration information includes at least one of:

a time domain resource and a frequency domain resource occupied by the indication information, a power control parameter, and adopted sequence and modulation coding manner.

Optionally, in the embodiment of the present application, the indication information further carries configuration information of the uplink data;

the communication unit 810 is further configured to:
receive the uplink data sent by the terminal device based on the configuration information of the uplink data.

Optionally, in the embodiment of the present application, the configuration information indicates at least one of:

an association relationship between the indication information and the uplink data, information associated with a HARQ process of the uplink data, a data block size of the uplink data, a time domain resource occupied by the uplink data, a frequency domain resource occupied by the uplink data, a modulation coding level of the uplink data, and a multi-antenna mode adopted for sending the uplink data.

Optionally, in the embodiment of the present application, the time domain resource occupied by the uplink data is indicated by carrying in the indication information at least one of: an index of the time domain resource, an index of a time-frequency domain resource to which the time domain resource belongs, an offset of the time domain resource relative to a reference point, and a size of the time domain resource; and/or the frequency domain resource occupied by the uplink data is indicated by carrying in the indication information at least one of: an index of the frequency domain resource, an index of a time-frequency domain resource to which the frequency domain resource belongs, an offset of the frequency domain resource relative to a reference point, and a size of the frequency domain resource.

Optionally, in the embodiment of the present application, the communication unit 810 is further configured to:
receive the uplink data sent by the terminal device based on pre-configuration information.

Optionally, in the embodiment of the present application, the pre-configuration information indicates at least one of:
an association relationship between the indication information and the uplink data, information associated with a HARQ process of the uplink data, a data block size of the uplink data, a time domain resource occupied by the uplink data, a frequency domain resource occupied by the uplink data, a modulation coding level of the uplink data, and a multi-antenna mode adopted for sending the uplink data.

Optionally, in the embodiment of the present application, the communication unit 810 is further configured to:
receive the uplink data sent by the terminal device based on an association relationship between the uplink data and the indication information.

Optionally, in the embodiment of the present application, the communication unit 810 is further configured to:
configure the association relationship to the terminal device.

Optionally, in the embodiment of the present application, the indication information is discontinuous with the uplink data in the time domain.

Optionally, in the embodiment of the present application, a time unit between the indication information and the uplink data is greater than or equal to a threshold.

Optionally, in the embodiment of the present application, the threshold is determined based on at least one of:
time for the terminal device to prepare the uplink data, time for the network device to decode the indication information, and time for the network device to avoid other terminal devices to carry out an uplink transmission on a resource occupied by the uplink data.

Optionally, in the embodiment of the present application, the indication information has the same format as a scheduling request (SR).

Optionally, in the embodiment of the present application, the indication information is a first demodulation reference signal (DMRS).

Optionally, in the embodiment of the present application, the first DMRS is used to demodulate the uplink data.

Optionally, in the embodiment of the present application, the indication information is uplink control information (UCI) and/or a second DMRS for demodulating the UCI.

Optionally, in the embodiment of the present application, the UCI is further used to indicate configuration information of the uplink data.

It should be understood that, in the embodiment of the present application, the network device 800 may be used to implement the operations implemented by the network device in the above method 400. For brevity, details are not described herein again.

Figure 13:
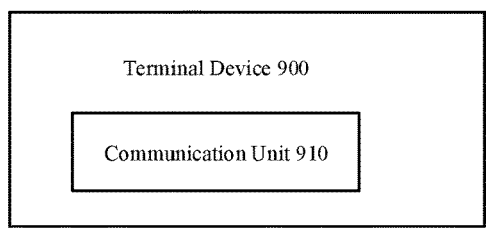
FIG. 13 is a schematic block diagram of a terminal device provided by an embodiment of the present application.

FIG. 13 is a schematic block diagram of a terminal device 900 according to an embodiment of the present application. The terminal device 900 includes a communication unit 910 configured to:
send indication information to a network device, the indication information being used to indicate that there is no uplink data on a pre-configured resource, and the indication information being located before the current resource.

Optionally, in the embodiment of the present application, the indication information has the same format as a scheduling request.

Optionally, in the embodiment of the present application, the communication unit 910 is further configured to:
when there is uplink data to be sent on the pre-configured resource, send the uplink data to the network device on the pre-configured resource.

Optionally, in the embodiment of the present application, the communication unit 910 is further configured to:
send the indication information based on configuration information for the indication information.

Optionally, in the embodiment of the present application, the configuration information includes at least one of:
a time domain resource and a frequency domain resource occupied by the indication information, a power control parameter, and adopted sequence and modulation coding manner.

It should be understood that, in the embodiment of the present application, the terminal device 900 may be used to implement the operations implemented by the terminal device in the above method 500. For brevity, details are not described herein again.

Figure 14:
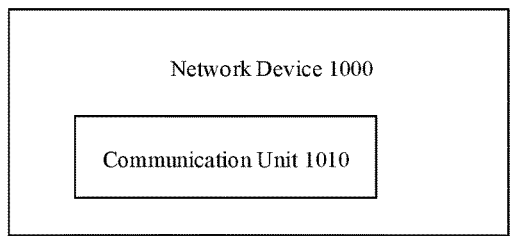
FIG. 14 is a schematic block diagram of a network device provided by an embodiment of the present application.

FIG. 14 is a schematic block diagram of a network device 1000 according to an embodiment of the present application. The network device 1000 includes a communication unit 1010 configured to:
detect indication information sent by a terminal device, the indication information being used to indicate that there is no uplink data on a current resource among pre-configured resources, and the indication information being located before the current resource.

Optionally, in the embodiment of the present application, the indication information has the same format as a scheduling request.

Optionally, in the embodiment of the present application, the communication unit 1010 is further configured to:
when the indication information is not detected, detect on the current resource among the pre-configured resources the uplink data sent by the terminal device;
when the indication information is detected, not detect on the current resource among the pre-configured resources uplink data sent by the terminal device.

Optionally, in the embodiment of the present application, the communication unit 1010 is further configured to:

detect indication information sent by the terminal device based on configuration information for the indication information.

Optionally, in the embodiment of the present application, the configuration information includes at least one of:

a time domain resource and a frequency domain resource occupied by the indication information, a power control parameter, and adopted sequence and modulation coding manner.

It should be understood that, in the embodiment of the present application, the network device 1000 may be used to implement the operations implemented by the network device in the above method 600. For brevity, details are not described herein again.

Figure 15:
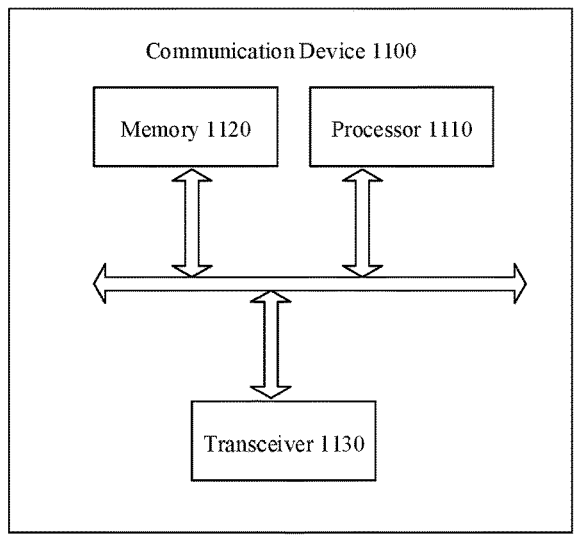
FIG. 15 is a schematic block diagram of a communication device provided by an embodiment of the present application.

FIG. 15 is a schematic structural diagram of a communication device 1100 according to an embodiment of the present application. The communication device 1100 shown in FIG. 15 includes a processor 1110, and the processor 1110 can call and run a computer program from a memory to implement the method in the embodiment of the present application.

Optionally, as shown in FIG. 15, the communication device 1100 may further include a memory 1120. The processor 1110 may call and run a computer program from the memory 1120 to implement the method provided in the embodiments of the present application.

The memory 1120 may be a separate component independent of the processor 1110, or may be integrated in the processor 1110.

Optionally, as shown in FIG. 13, the communication device 1100 may further include a transceiver 1130, and the processor 1110 may control the transceiver 1130 to communicate with other device(s). Specifically, the transceiver may send information or data to other device(s), or receive information or data sent by other device(s).

The transceiver 1130 may include a transmitter and a receiver. The transceiver 1130 may further include an antenna, and the number of antennas may be one or more.

Optionally, the communication device 1100 may specifically be the network device in the embodiment of the present application, and the communication device 1100 may implement the corresponding process implemented by the network device in each method of the embodiments of the present application. For brevity, details are not described herein again.

Optionally, the communication device 1100 may specifically be the terminal device of the embodiment of the present application, and the communication device 1100 may implement the corresponding process implemented by the terminal device in each method of the embodiments of the present application. For brevity, details are not described herein again.

Figure 16:
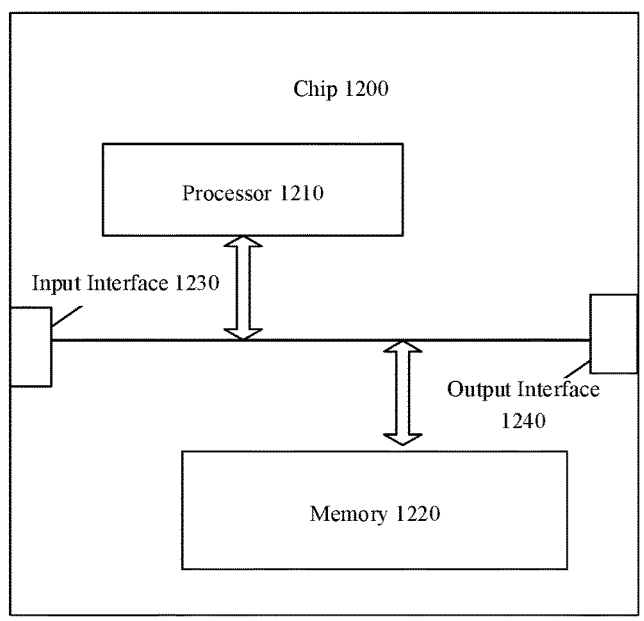
FIG. 16 is a schematic block diagram of a chip provided by an embodiment of the present application.

FIG. 16 is a schematic structural diagram of a chip of an embodiment of the present application. The chip 1200 shown in FIG. 16 includes a processor 1210, and the processor 1210 may call and run a computer program from the memory to implement the method provided in the embodiments of the present application.

Optionally, as shown in FIG. 16, the chip 1200 may further include a memory 1220. The processor 1210 may call and run a computer program from the memory 1220 to implement the method provided in the embodiments of the present application.

The memory 1220 may be a separate component independent of the processor 1210, or may be integrated in the processor 1210.

Optionally, the chip 1200 may further include an input interface 1230. The processor 1210 may control the input interface 1230 to communicate with other device(s) or chip(s). Specifically, the input interface may obtain information or data sent by other device(s) or chip(s).

Optionally, the chip 1200 may further include an output interface 1240. The processor 1210 may control the output interface 1240 to communicate with other device(s) or chip(s). Specifically, the output interface may output information or data to other device(s) or chip(s).

Optionally, the chip may be applied to the network device in the embodiments of the present application, and the chip may implement the corresponding process implemented by the network device in each method of the embodiments of the present application. For brevity, details are not described herein again.

Optionally, the chip may be applied to a mobile terminal/terminal device in the embodiments of the present application, and the chip may implement the corresponding procedure implemented by the mobile terminal/terminal device in each method of the embodiments of the present application. For brevity, details are not described herein again.

It should be understood that the chips mentioned in the embodiments of the present application may also be referred to as system-level chips, system chips, chip systems, or system-on-chips.

Figure 17:
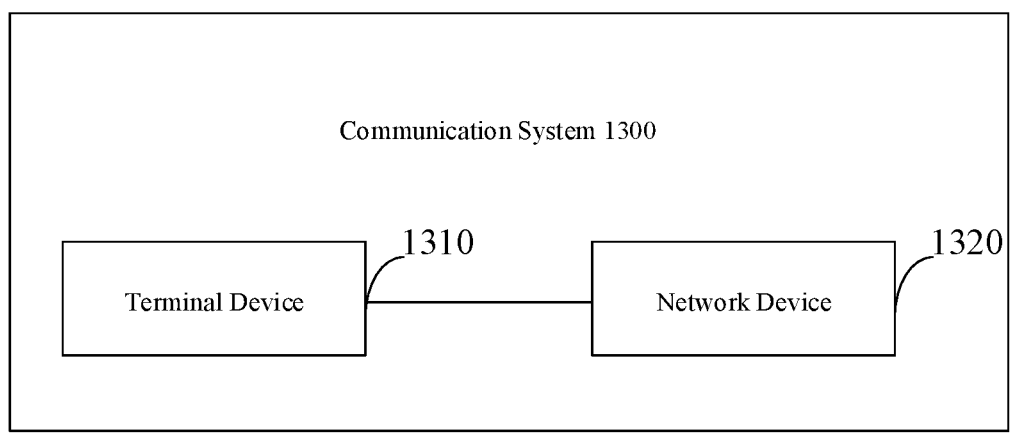
FIG. 17 is a schematic block diagram of a communication system provided by an embodiment of the present application.

FIG. 17 is a schematic block diagram of a communication system 900 according to an embodiment of the present application. As shown in FIG. 17, the communication system 900 includes a terminal device 910 and a network device 920.

The terminal device 910 may be used to implement the corresponding function implemented by the terminal device in the above method, and the network device 920 may be used to implement the corresponding function implemented by the network device in the above method. For brevity, details are not described herein again.

It should be understood that the processors in the embodiments of the present application may be an integrated circuit chip which has signal processing capability. During implementation, each step of the foregoing method embodiments can be completed by an integrated hardware logic circuit or software instructions in the processors. The above-described processors may be a general-purpose processor, a Digital Signal Processors (DSPs), an Application Specific Integrated Circuit (ASIC), a Field Programmable Gate Array (FPGA) or other programmable logic devices, discrete gates or transistor logic devices, discrete hardware components, which can implement or perform the methods, steps, and logical block diagrams disclosed in the embodiments of the present application. The general-purpose processor may be a microprocessor or any conventional processor. The steps of the methods disclosed in the embodiments of the present application may be directly completed by a hardware decoding processor, or by a combination of hardware and software modules in the decoding processor. The software modules may be located in a storage medium that is well-known in the art such as a random access memory, a flash memory, a read only memory, a programmable read only memory or an electrically erasable programmable memory, a register. The storage medium is located in the memory, and the processor reads information in the memory and completes the steps of the above-described methods with its hardware.

It can be understood that the memory in the embodiments of the present application maybe a volatile memory or a non-volatile memory, or may include both volatile memory and non-volatile memory. The non-volatile memory maybe a Read-Only Memory (ROM), a Programmable ROM (PROM), an Erasable PROM (EPROM), an Electrically EPROM (EEPROM) or a flash memory. The volatile memory may be a Random Access Memory (RAM) that serves as an external cache. By exemplary rather than limiting way, many forms of RAMs may be used, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It should be noted that the memories in the systems and methods described herein are intended to include, but not limited to, these and any other suitable types of memories.

It should be understood that the above memory is exemplary but not restrictive. For example, the memory in the embodiments of the present application may also be static RAM (SRAM), dynamic RAM (DRAM), Synchronous DRAM (SDRAM), double data rate SDRAM (DDR SDRAM), enhanced SDRAM (ESDRAM), synch link DRAM (SLDRAM) and Direct Rambus RAM (DR RAM), etc. That is to say, the memory in the embodiments of the present application is intended to include but not limited to these and any other suitable types of memory.

The embodiments of the present application also provide a computer readable storage medium for storing a computer program.

Optionally, the computer readable storage medium may be applied to the network device in the embodiments of the present application, and the computer program enables the computer to execute the corresponding process implemented by the network device in each method of the embodiments of the present application. For brevity, details are not described herein again.

Optionally, the computer readable storage medium may be applied to the mobile terminal/terminal device in the embodiments of the present application, and the computer program enables the computer to execute the corresponding process implemented by the mobile terminal/terminal device in each method of the embodiments of the present application. For brevity, details are not described herein again.

A computer program product is further provided in an embodiment of the present application. The computer program product includes computer program instructions.

Optionally, the computer program product may be applied to the network device in the embodiments of the present application, and the computer program instructions enable the computer to execute the corresponding process implemented by the network device in each method of the embodiments of the present application. For brevity, details are not described herein again.

Optionally, the computer program product may be applied to the mobile terminal/terminal device in the embodiments of the present application, and the computer program instructions enable the computer to execute the corresponding process implemented by the mobile terminal/terminal device in each method of the embodiments of the present application. For brevity, details are not described herein again.

A computer program is further provided in an embodiment of the present application.

Optionally, the computer program may be applied to the network device in the embodiments of the present application. When the computer program is run on a computer, the computer executes the corresponding process implemented by the network device in each method of the embodiments of the present application. For brevity, details are not described herein again.

Optionally, the computer program may be applied to the mobile terminal/terminal device in the embodiments of the present application. When the computer program is run on a computer, the computer executes the corresponding process implemented by the network device in each method of the embodiments of the present application. For brevity, details are not described herein again.

Those of ordinary skill in the art may recognize that various exemplary units and algorithm steps described in the embodiments disclosed herein may be realized in electronic hardware, or a combination of computer software and electronic hardware. Whether these functions are performed in hardware or software depends on specific applications and design constraints of the technical solution. Skilled artisans may use different methods to implement the described functions for each particular application, but such implementation should not be considered to be beyond the scope of the present application.

Those skilled in the art may clearly understand that for convenience and conciseness of description, the specific working processes of the system, device and unit described above may refer to the corresponding processes in the aforementioned method embodiments and will not be elaborated here.

In several embodiments provided by the present application, it should be understood that the disclosed systems, devices and methods may be implemented in other ways. For example, the apparatus embodiments described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the components shown as a unit may or may not be a physical unit, i.e., they may be located in one place or may be distributed over multiple network units. Some or all of the units may be selected according to actual needs to achieve the purpose of solutions of the embodiments of the present application.

In addition, various functional units in various embodiments of the present application may be integrated in one processing unit, or the various units may be physically present separately, or two or more units may be integrated in one unit.

The functions may be stored in a computer readable memory medium if realized in a form of software functional units and sold or used as a separate product. Based on this understanding, the technical solution of the present application, in essence, or the part contributing to the prior art, or the part of the technical solution, may be embodied in the form of a software product stored in a storage medium, including a number of instructions for causing a computer device (which may be a personal computer, a server, or a network device and the like) to perform all or part of the steps of the method described in various embodiments of the present application. The aforementioned storage medium includes U disk, mobile hard disk, read-only memory (ROM), random access memory (RAM), magnetic disk or optical disk, and other medium capable of storing program codes.

What are described above are merely exemplary embodiments of the present application, but the protection scope of the present application is not limited thereto. Any variation or substitution that may be easily conceived by a person skilled in the art within the technical scope disclosed by the present application shall be included within the protection scope of the present application. Therefore, the protection scope of the present application shall be determined by the protection scope of the claims.

What is claimed is:

1. A wireless communication method, comprising:
sending, by a terminal device, indication information to a network device, the indication information being used to indicate that there is uplink data in a time domain after the indication information; and
after sending the indication information in the time domain, sending, by the terminal device, the uplink data to the network device based on an association relationship between the uplink data and the indication information in terms of resource occupation, wherein the association relationship is configured by the network device or preset in the terminal device based on a protocol,
wherein a time unit spaced between the indication information and the uplink data is greater than or equal to a threshold.

2. The method according to claim 1, wherein the sending, by the terminal device, the indication information to the network device, comprises:
sending, by the terminal device, the indication information based on configuration information for the indication information,
wherein the configuration information comprises at least one of:
a time domain resource and a frequency domain resource occupied by the indication information, a power control parameter, and adopted sequence and modulation coding manner.

3. The method according to claim 1, wherein the sending, by the terminal device, the uplink data to the network device, comprises:
sending, by the terminal device, the uplink data to the network device based on pre-configuration information,
wherein the pre-configuration information indicates at least one of:
an association relationship between the indication information and the uplink data, information associated with a HARQ process of the uplink data, a data block size of the uplink data, a time domain resource occupied by the uplink data, a frequency domain resource occupied by the uplink data, a modulation coding level of the uplink data, and a multi-antenna mode adopted for sending the uplink data.

4. The method according to claim 1, wherein the indication information is discontinuous with the uplink data in the time domain.

5. The method according to claim 1, wherein the threshold is determined based on at least one of:
time for the terminal device to prepare the uplink data, time for the network device to decode the indication information, and time for the network device to avoid other terminal device to carry out an uplink transmission on a resource occupied by the uplink data.

6. A wireless communication method, comprising:
receiving, by a network device, indication information sent by a terminal device, the indication information being used to indicate that there is uplink data in a time domain after the indication information; and
after receiving the indication information in the time domain, receiving, by the network device, the uplink data sent by the terminal device based on an association relationship between the uplink data and the indication information in terms of resource occupation, wherein the association relationship is configured by the network device or preset in the terminal device based on a protocol,
wherein a time unit spaced between the indication information and the uplink data is greater than or equal to a threshold.

7. The method according to claim 6, wherein the receiving, by the network device, indication information sent by the terminal device, comprises:
receiving the indication information based on configuration information for the indication information,
wherein the configuration information comprises at least one of:
a time domain resource and a frequency domain resource occupied by the indication information, a power control parameter, and adopted sequence and modulation coding manner.

8. The method according to claim 6, wherein the receiving, by the network device, the uplink data sent by the terminal device, comprises:
receiving, by the network device, the uplink data sent by the terminal device based on pre-configuration information,
wherein the pre-configuration information indicates at least one of:
an association relationship between the indication information and the uplink data, information associated with a HARQ process of the uplink data, a data block size of the uplink data, a time domain resource occupied by the uplink data, a frequency domain resource occupied by the uplink data, a modulation coding level of the uplink data, and a multi-antenna mode adopted for sending the uplink data.

9. A terminal device, comprising:
a processor;
a memory; and
a transceiver,
wherein the memory is used to store a computer program, and the processor is used to call and run the computer program stored in the memory to:
send indication information to a network device via the transceiver, the indication information being used to indicate that there is uplink data in a time domain after the indication information; and
after sending the indication information in the time domain, send the uplink data to the network device based on an association relationship between the uplink data and the indication information in terms of resource occupation, wherein the association relationship is configured by the network device or preset in the terminal device based on a protocol,
wherein a time unit spaced between the indication information and the uplink data is greater than or equal to a threshold.

10. The device according to claim 9, wherein the processor is further configured to:

send the indication information based on configuration information for the indication information via the transceiver, wherein the configuration information comprises at least one of:
a time domain resource and a frequency domain resource occupied by the indication information, a power control parameter, and adopted sequence and modulation coding manner.

11. The device according to claim 9, wherein the processor is further configured to:
send the uplink data to the network device based on pre-configuration information via the transceiver, wherein the pre-configuration information indicates at least one of:
an association relationship between the indication information and the uplink data, information associated with a HARQ process of the uplink data, a data block size of the uplink data, a time domain resource occupied by the uplink data, a frequency domain resource occupied by the uplink data, a modulation coding level of the uplink data, and a multi-antenna mode adopted for sending the uplink data.

12. A network device, comprising:
a processor;
a memory; and
a transceiver,
wherein the memory is used to store a computer program, and the processor is used to call and run the computer program stored in the memory to:
receive indication information sent by a terminal device via the transceiver, the indication information being used to indicate that there is uplink data in a time domain after the indication information; and
after receiving the indication information in the time domain, receive the uplink data sent by the terminal device based on an association relationship between the uplink data and the indication information in terms of resource occupation, wherein the association relationship is configured by the network device or preset in the terminal device based on a protocol,
wherein a time unit spaced between the indication information and the uplink data is greater than or equal to a threshold.

13. The device according to claim 12, wherein the processor is further configured to:
receive the indication information based on configuration information for the indication information via the transceiver,
wherein the configuration information comprises at least one of:
a time domain resource and a frequency domain resource occupied by the indication information, a power control parameter, and adopted sequence and modulation coding manner.

14. The device according to claim 12, wherein the processor is further configured to:
receive the uplink data sent by the terminal device based on pre-configuration information via the transceiver,
wherein the pre-configuration information indicates at least one of:
an association relationship between the indication information and the uplink data, information associated with a HARQ process of the uplink data, a data block size of the uplink data, a time domain resource occupied by the uplink data, a frequency domain resource occupied by the uplink data, a modulation coding level of the uplink data, and a multi-antenna mode adopted for sending the uplink data.

* * * * *